United States Patent [19]

Herrnkind et al.

[11] Patent Number: 4,663,244
[45] Date of Patent: May 5, 1987

[54] FILLER CONTAINING EASILY OXIDIZABLE ELEMENTS

[75] Inventors: Wolfgang Herrnkind, Schwalbach; Reinhard Itzenhäuser, Langenhain; Gerhard Kosfeld, Falkenstein, all of Fed. Rep. of Germany

[73] Assignee: Messer Griesheim GmbH, Fed. Rep. of Germany

[21] Appl. No.: 805,332

[22] Filed: Dec. 5, 1985

Related U.S. Application Data

[63] Continuation of Ser. No. 530,980, Sep. 9, 1983, abandoned.

[51] Int. Cl.⁴ .................................................. B22F 7/04
[52] U.S. Cl. ...................................... 428/564; 148/22; 148/24; 148/26; 219/146.31; 228/263.11
[58] Field of Search ................ 228/263.11; 148/22, 148/24, 26; 219/146.31; 428/564

[56] References Cited

U.S. PATENT DOCUMENTS

| | | | |
|---|---|---|---|
| 3,966,424 | 6/1976 | Godai et al. | 428/558 |
| 3,995,139 | 11/1976 | Bouvard | 148/24 |
| 4,010,309 | 3/1977 | Petersen | 148/26 |
| 4,087,673 | 5/1978 | Kiilunen | 148/26 |
| 4,368,371 | 1/1983 | Dilthey et al. | 148/26 |
| 4,512,822 | 4/1985 | Barringer et al. | 148/26 |
| 4,557,768 | 12/1985 | Barringer et al. | 148/24 |

Primary Examiner—Stephen J. Lechert, Jr.
Attorney, Agent, or Firm—Connolly & Hutz

[57] ABSTRACT

A filler containing easily oxidizable elements such as aluminum, titanium, zirconium, rare earth metals as well as a powder combination containing fluorides and carbonates is used for fusion welding steel, nickel and cobalt alloys and corresponding castings containing easily oxidizable elements. The ratio of the dry weight of all fluorides to the dry weight of the alkaline earth carbonates in the powder combination is at least 2.2:1.

18 Claims, No Drawings

FILLER CONTAINING EASILY OXIDIZABLE ELEMENTS

CROSS-REFERENCE TO RELATED APPLICATION

This application is a continuation application of Ser. No. 530,980 filed Sept. 9, 1983, now abandoned.

BACKGROUND OF INVENTION

The invention relates to a filler containing easily oxidizable elements such as aluminum (Al), titanium (Ti), zirconium (Zr), rare earths as well as a powder combination containing fluorides and carbonates for fusion welding of steel, nickel and cobalt alloys and corresponding castings containing easily oxidizable elements.

Welded joints are required to have at least the mechanical-technological quality of the materials to be joined. The composition of filler and base metal is decisive for the chemical composition—and consequently for the mechanical-technological quality—of a welded seam.

Heat resistant and extremely heat resistant alloys (base metals) are known which contain in addition to high percentages of nickel, chromium, molybdenum and cobalt also easily oxidizable alloy percentages of aluminum and/or titanium. In that case, the aluminum provides the oxidation resistance necessary at high operating temperatures, for example, the NiCr23Co12MO material (mat. no. 2.4663) alloyed with 0.8 ... 1.5% Al.

Alloys which can harden by precipitation and the martensitic-hardening steels contain even higher titanium and/or aluminum percentages, for example, mat. no. 2.4654 with 1.2 ... 1.6% Al and 2.8 ... 3.3% Ti, i.e. mat. no. 1.6356 (X2 NiCoMoTi 18144) with 1.5 ... 2.0% Ti.

These alloys can only be fully utilized in practice if they can be welded according to the same nature, in other words, the filler provides a weld in its composition having the same analysis as the base metal.

This type of extremely heat resistant alloy having easily oxidizable elements is known from DE-OS No. 22 38 609 which can be used as base metal and as filler. In this case fusion of the filler takes place according to the MIG method (metal electrode inert gas welding) under argon. Oxidation of the easily oxidizable elements is prevented as a result of this argon atmosphere and a weld having the same analysis is obtained.

It is, moreover, known from EP-PS No. 00 46 38 to fuse a base metal having easily oxidizable elements with a sheathed stick electrode with a core wire having the same analysis as the base metal. During welding, a burning off of the easily oxidizable elements takes place so that, for example, based on a core wire with 1.2% aluminum only residues of about 0.25% arrive in the weld as a result of oxidation. The produced low oxidation resistance of the weld, according to EP-PS No. 00 46 38, is compensated for by the addition of chromium, magnesium and niobium. The welding process with a sheathed stick electrode known from EP-PS No. 00 46 38, therefore, does not result in a weld having the same analysis as the base metal as a result of the oxidation of the easily oxidizable elements.

Tests have shown, moreover, that a weld having the same analysis cannot be attained even with the addition of the easily oxidizable elements in the sheath of the stick electrode. Percentages of about 0.5% of these elements are only attained in the weld whereby for such a low result, completely unsatisfactory welding properties (high ejection, uncontrolled melting of the crater) must be accepted.

Based on knowledge gained in MIG welding under argon in which oxidation is prevented by keeping oxygen away, also in welding with a sheathed electrode resp. with filler wires or in UP welding (submerged arc welding), the easily oxidizable alloy elements in the filler could be protected by using only oxygen-free components.

Among the materials currently used in the filler production, the following materials would accordingly be disadvantageous: the alkaline earth carbonates and their oxides as well as quartz (silicates), rutile (titanates), zirconium oxide (zirconates) and all heavy metal oxides.

Aluminum oxide and the aluminates are an exception based on their high formation heat.

The following oxygen-free components meet the stated requirements: alkali and alkaline earth fluoride including the complex fluorides, for example, cryolite.

An exclusive use of fluorides leads, however, to considerable problems with respect to welding technology. With sheathed stick electrodes, for example, the low melting point of the sheath is a disadvantage for a good crater formation at the end of the electrode. The resulting welding with a long light arc again leads to oxidation of the easily oxidizable elements from the arc atmosphere. Even the use of oxygen-free components, therefore, does not lead to a weld having the same analysis as the base metal.

SUMMARY OF INVENTION

The invention is based on the object of providing a filler which prevents the oxidation of the easily oxidizable alloy elements such as as aluminum, zirconium, titanium as well as of the rare earths and provides a weld having at least the same analysis as the base metal.

The object is met according to the invention by a powder combination contained in the filler in which the ratio of the dry weight of all fluorides to the dry weight of the alkaline earth carbonates is at least 2.2:1, preferably 3:1 or higher.

DETAILED DESCRIPTION

The advantages obtained with the invention are found, in particular, in the surprising possibility of producing a weld with easily oxidizable elements having the same analysis as a base metal with easily oxidizable elements also in welding with a sheathed electrode i.e., with filler rods or filler wires and in UP (i.e., under powder or submerged arc). welding. It became clearly possible, therefore, to use the appropriately best welding process and to, nevertheless, form a weld without different nature alloy elements, having the same properties as the base metal. The filler according to the invention can be simply adapted to the appropriate welding process whereby the ratio of fluorides and alkaline earth carbonates depending on the welding process is achieved in the sheath or in the powder. The production of the appropriate filler such as sheathed electrode, filler wire, UP powder takes place according to the known production process whereby the appropriate filler of course contains the additives necessary for the production such as lubricants and binders (Tylose, alginates, water glass, etc.) Any base metal with easily oxidizable elements can be fused as a result of appropriate composition of the core wire of the tube material i.e., the wire electrode.

Wrought and cast materials of any low, medium and high alloy steel containing easily oxidizable elements, all alloys containing nickel and cobalt as main base element (percentage higher or lower than 50% corresponding DIN 1736, part 1) can preferably be fused with a filler according to the invention.

The invention has, moreover, made it possible advantageously to provide the easily oxidizable elements in the sheath i.e., in the powder and to use as core wire i.e., tube material, i.e., as wire electrode a material having a low percentage of easily oxidizable elements.

In addition, a higher percentage of these elements can be attained by increased additions of the easily oxidizable elements in the weld if contained in the base metal.

A targeted added burning or burning off can be adjusted with the additionally provided easily oxidizable elements independent of the composition of the stick or wire-shaped solid filler. The additionally provided oxidizable elements may be contained pure in the sheath i.e., in the powder or as master alloys i.e., compounds.

The provision of a filler having a powder combination of fluorides and alkaline earth carbonates was, therefore, unexpectedly possible with the invention, which not only offers an adequate protection for easily oxidizable elements but has, in addition, very good welding properties.

The powder combination is preferably based on the system cryolite ($Na_3AlF_6$)—fluor spar ($CaF_2$). The high cryolite percentage provides the advantage that in addition to oxidation protection as main objective all produced percentages of aluminum oxide are quickly and safely removed without interfering with the welding process.

The fluor spar percentage reduces the surface tensions and assures a uniform slag distribution. As flux, it has, furthermore, a cleaning effect and leads even for non-scaling alloys to a good wetting (clean bond) of the weld at the base metal or at the already hardened weld.

Moreover, instead of cryolite another complex salt corresponding to the general formula $(alkali)_3AlF_6$ can also be advantageously used.

In an advantageous refinement, the powder combination contains elements such as potassium, calcium, titanium, sodium and/or carbon to improve light arc stabilization and additives such as aluminum oxide ($Al_2O_3$) as well as small amounts of rutile ($TiO_2$) and silicate ($SiO_2$) to improve slag removal.

The current state of the art as well as the invention are explained in Tables 1 to 5 with examples.

Table 1 shows the powder combinations for welding base metals without oxidizable elements.

Table 2 shows the powder combination of the invention.

Table 3 shows the effect of the powder combination on the weld analysis when using powder combinations of the state of the art of the invention.

Table 4 shows mechanical quality values.

Table 5 shows the powder combinations of the invention and the associated weld analysis for materials with high titanium content.

The analyses in Table 3 show the effect of welding process and powder combination on the content of easily oxidizable alloy elements in the weld with the example of material S-NiCr22Co12Mo (mat. no. 2.4627). The comparison of column 7 with column 1 shows that the analysis of the wire in welding with non-oxidizing inert gases remains retained almost without change in the weld. Column 2 shows that titanium and aluminum for a usual sheath composition burn off to residues. The Al contents of 3 . . . 6, for example, attained according to the invention with a powder combination of Table 2, column 1 with different aluminum percentages (a=3.5; b=5; c=6.5; d=8) demonstrate that with this new powder combination percentages independent of the core wire can be attained. It should be pointed out especially that considerable increases are even possible. The weld produced with the new powder combinations with sheathed stick electrodes has the same good mechanical properties as the weld produced with inert gas welding (Table 4).

For the high strength martensitic-hardening steel X2NiCoMoTi 18144 (mat. no. 1.6356), Table 5, a weld having the same analysis for a material with increased titanium content can, for example, also be adjusted with the powder combination given in Table 2, column 3 with 0% Al and 15% FeTi.

The precipitation-hardening nickel alloy with material no. 2.4654, Table 5, demonstrates that a weld having the same analysis can also be melted, for example, with the new powder combination of Table 2, column 3 with 3% Al and 10% FeTi, in which high contents of aluminum and of titanium are to be maintained.

TABLE 1

Powder combination for welding base metals without oxidizable elements.

| TYPE I | | TYPE II | |
|---|---|---|---|
| 40 | 50% $CaCO_3$ | 35 | 45% $CaCO_3$ |
| 35 | 50% $CaF_2$ | 5 | 10% $MgCO_3$ |
| 5 | 10% $SiO_2$ | 35 | 50% $Na_3AlF_6$ |
| 5 | 10% fluor spar | 5 | 10% $SiO_2$ |
| 5 | 10% deoxidation agent | 5 | 10% $TiO_2$ |

TABLE 2

Powder combination of the invention in dry % by weight

| | 1 | 2 | 3 |
|---|---|---|---|
| cryolite $Na_3AlF_6$ | 55 | 60 | 50 |
| fluor spar $CaF_2$ | 15 | 20 | 25 |
| marble/chalk $CaCo_3$ | 20 | 10 | 5 |
| magnesite $MgCO_3$ | — | 5 | 5 |
| Al and/or FeTi | 10 | 5 | 15 |

TABLE 3

Effect of the powder combination for sheathed stick electrodes on the chemical composition of the weld compared to starting wire and to the weld produced in the inert gas process (alloy type: wire i.e. core wire mat. no. 2.4627).

| | base metal i.e. core wire i.e. wire electrode mat. no. 2.4627 | sheath of known powder acc. Table 1 type II | weld analysis sheath of powder combination acc. invention, variants | | | | MIG process with pure argon as inert gas |
|---|---|---|---|---|---|---|---|
| | | | a | b | c | d | |
| column | 1 | 2 | 3 | 4 | 5 | 6 | 7 |
| Al | 1.15 | 0.16 | 0.80 | 1.12 | 1.28 | 1.42 | 1.12 |
| Ti | 0.46 | 0.22 | 0.44 | 0.44 | 0.48 | 0.52 | 0.40 |
| Cr | 21.9 | 22.4 | 21.8 | | | | 21.9 |
| Ni | basis | basis | basis | | | | basis |
| Mo | 8.7 | 8.8 | 8.6 | | | | 8.7 |
| Co | 11.7 | 11.3 | 11.3 | | | | 11.6 |
| Fe | 0.50 | 1.09 | 0.65 | | | | 0.55 |
| S | 0.002 | 0.004 | 0.002 | | | | 0.002 |

TABLE 4

Mechanical quality values of the weld at room temperature. Electrode with sheath from powder combination according to the invention compared to inert gas welding with pure argon.

| | weld from sheathed stick electrode, sheath from powder combination according to the invention, see Table 3 variant b | weld according to the MIG process with pure argon as inert gas see Table 3, column 7 |
|---|---|---|
| column | 1 | 2 |
| 0.2 elongation limit N/mm² | 520 | 494 |
| 1.0 elongation limit N/mm² | 560 | 540 |
| tensile strength N/mm² | 781 | 778 |
| elongation at break % (l o = 5 do) | 42 | 43 |
| impact study of ISO-V samples at +20° C. Joule | 86, 89, 94 | 104, 107, 115 |

TABLE 5

Further examples for the application of the powder combination according to the invention to materials with easily oxidizable alloy elements each time with the same nature core wire.

| | base metal resp. core wire mat. no. 1.6356 | weld of sheathed electrodes | base metal resp. core wire mat. no. 2.4654 | weld of sheathed electrodes |
|---|---|---|---|---|
| Al | 0.10 | 0.10 | 1.35 | 1.48 |
| Ti | 1.72 | 1.58 | 3.34 | 3.18 |
| Cr | — | — | 18.6 | 18.4 |
| Ni | 18.2 | 17.2 | basis | basis |
| Mo | 4.1 | 3.4 | 4.4 | 4.3 |
| Co | 11.7 | 11.6 | 13.4 | 13.5 |
| Fe | basis | basis | 0.7 | 1.9 |

What is claimed is:

1. A welding material for the fusion welding of steel, nickel and cobalt alloys and corresponding castings comprising a base material and an additive, said base material being selected from the group consisting predominantly of steel, nickel and cobalt alloys, said base material containing at least one easily oxidizable element selected from the group consisting of aluminum, titanium, zirconium and rare earths, said additive comprising a filler containing at least one of said easily oxidizable elements and a powder combination containing fluorides and carbonates, and the ratio of the dry weight of all fluorides to the dry weight of the alkaline earth carbonates in said powder combination being at least 2.2:1.

2. Welding material according to claim 1, characterized in that the ratio is at least 3:1.

3. Welding material according to claim 2, characterized in that the easily oxidizable elements are provided in the form of a cylindrical member and the powder combination is a component of a sheath surrounding the cylindrical member.

4. Welding material according to claim 3, characterized in that the cylindrical member is a rod.

5. Welding material according to claim 3, characterized in that the cylindrical member is a tube-shaped core wire.

6. Welding material according to claim 2, characterized in that the easily oxidizable elements are provided in a tube and the powder combination is a component of a powder filling of the tube.

7. Welding material according to claim 2, characterized in that the easily oxidizable elements are provided in a wire electrode and the powder combination is a component of a submerged arc welding powder.

8. Welding material according to claim 3, characterized in that the powder combination contains additional percentages of said easily oxidizable elements in pure form.

9. Welding material according to claim 3, characterized in that the powder combination contains additional percentages of said easily oxidizable elements in alloy form.

10. Welding material according to claim 6, characterized in that the powder combination contains additional percentages of said easily oxidizable elements in pure form.

11. Welding material according to claim 6, characterized in that the powder combination contains additional percentages of said easily oxidizable elements in alloy form.

12. Welding material according to claim 7, characterized in that the powder combination contains additional percentages of said easily oxidizable elements in pure form.

13. Welding material according to claim 7, characterized in that the powder combination contains additional percentages of said easily oxidizable elements in alloy form.

14. Welding material according to claim 1, characterized in that the powder combination contains elements selected from the group consisting of potassium, calcium, sodium, titanium and carbon for light arc stabilization and additives to improve slag removal.

15. Welding material according to claim 14, characterized in that the additives to improve slag removal comprise aluminum oxide and small amounts of rutile and silicates.

16. In a method of fusion welding of steel, nickel and cobalt alloys and corresponding castings comprising a base material and an additive, including the steps of selecting the base material from the group consisting predominantly of steel, nickel and cobalt alloys, with the base material containing at least one easily oxidizable element selected from the group consisting of aluminum, titanium, zirconium and rare earths, selecting an additive comprising a filler containing at least one of said easily oxidizable elements and a powder combination containing fluorides and carbonates, and using a ratio of the dry weight of all fluorides to the dry weight of the alkaline earth carbonates in the powder combination of at least 2.2:1.

17. In a method of fusion welding of steel, nickel and cobalt alloys as well as the appropriate cast iron types with easily oxidizable elements such as aluminum (Al), titanium (Ti), zirconium (Zr) and rare earths as well as a powder mix which contains fluorides and carbonates and whereby in the powder mix the ratio of the dry weight of all fluorides to the dry weight of the alkaline earth carbonates is at least 2.2:1 as an additive component for the fusion welding.

18. In the method of claim 17 wherein the ratio is at least 3:1.

* * * * *